DU012386904B2

United States Patent
Bala et al.

(10) Patent No.: US 12,386,904 B2
(45) Date of Patent: Aug. 12, 2025

(54) SYSTEMS AND METHODS FOR MEASURING COLLECTED CONTENT SIGNIFICANCE

(71) Applicant: TruValue Labs, Inc., San Francisco, CA (US)

(72) Inventors: Gregory Bala, Morgan Hill, CA (US); Sebastian Brinkmann, San Francisco, CA (US); Hendrik Bartel, San Francisco, CA (US); James P. Hawley, Oakland, CA (US); Philip Kim, San Fransisco, CA (US); Yang Ruan, Oakland, CA (US); Mark Strehlow, San Fransisco, CA (US); Faithlyn A. Tulloch, San Fransisco, CA (US)

(73) Assignee: Truvalue Labs, Inc., San Francisco, CA (US)

( * ) Notice: Subject to any disclaimer, the term of this patent is extended or adjusted under 35 U.S.C. 154(b) by 0 days.

(21) Appl. No.: 16/328,673

(22) PCT Filed: Aug. 29, 2017

(86) PCT No.: PCT/US2017/049221
§ 371 (c)(1),
(2) Date: Feb. 26, 2019

(87) PCT Pub. No.: WO2018/044955
PCT Pub. Date: Mar. 8, 2018

(65) Prior Publication Data
US 2019/0205341 A1 Jul. 4, 2019

Related U.S. Application Data

(60) Provisional application No. 62/380,854, filed on Aug. 29, 2016.

(51) Int. Cl.
*G06F 15/16* (2006.01)
*G06F 16/00* (2019.01)
(Continued)

(52) U.S. Cl.
CPC .......... *G06F 16/906* (2019.01); *G06F 16/00* (2019.01); *G06F 16/24578* (2019.01);
(Continued)

(58) Field of Classification Search
None
See application file for complete search history.

(56) References Cited

U.S. PATENT DOCUMENTS

2010/0121849 A1* 5/2010 Goeldi ................ G06Q 50/01
707/736
2013/0151522 A1* 6/2013 Aggarwal ............ G06F 16/355
707/737

OTHER PUBLICATIONS

Marcus, et al. TwitInfo: Aggregating and Visualizing Microblogs for Event Exploration. CHI 2011, pp. 227-236. (Year: 2011).*
(Continued)

*Primary Examiner* — Alex Gofman
*Assistant Examiner* — Shelly X Qian
(74) *Attorney, Agent, or Firm* — HUNTON ANDREWS KURTH LLP

(57) ABSTRACT

Systems and methods are provided for identifying meta-events. A plurality of event items are received over a given period of time. The plurality of event items are analyzed to determine one or more areas of interests. One or more characteristics of the plurality of events items is measured. The measured number of event items within the particular area of interest within the given time period are compared against a measured number of even items within the particular area of interest within a previous time period. It is determined that a meta-event has occurred when the difference between the measured number of event items within
(Continued)

the particular area of interest compared to the measured number of items within the particular area of interest within a previous time period exceeds a threshold measure of event items.

13 Claims, 7 Drawing Sheets

(51) Int. Cl.
*G06F 16/2457* (2019.01)
*G06F 16/2458* (2019.01)
*G06F 16/906* (2019.01)
*G06F 16/908* (2019.01)
*G06F 16/9536* (2019.01)
*G06F 16/9537* (2019.01)

(52) U.S. Cl.
CPC ........ *G06F 16/2477* (2019.01); *G06F 16/908* (2019.01); *G06F 16/9536* (2019.01); *G06F 16/9537* (2019.01)

(56) References Cited

OTHER PUBLICATIONS

Bifet et al. Sentiment knowledge discovery in twitter streaming data. In Proc. of 13th International Conference on Discovery Science. 2010, pp. 1-15. (Year: 2010).*
Atefeh et al. A Survey of Techniques for Event Detection in Twitter. Computational Intelligence, 2013, pp. 1-33. (Year: 2013).*
Zhou et al. Event detection over twitter social media streams. The VLDB Journal (2014) 23:381-400. (Year: 2014).*

* cited by examiner

Significance Factor — visualization

SYSTEMS AND METHODS FOR MEASURING COLLECTED CONTENT SIGNIFICANCE

CROSS-REFERENCE TO RELATED APPLICATIONS

This application is a national stage entry of PCT/2017/49221, entitled SYSTEMS AND METHODS FOR MEASURING COLLECTED CONTENT SIGNIFICANCE, and filed on Aug. 29, 2017, which claims priority to U.S. Provisional Patent Application No. 62/380,854 filed on Aug. 29, 2016, each of which is incorporated by reference in its entirety for any purpose.

BACKGROUND OF THE INVENTION

Events, state or status changes, impacts, performance reports, or any observable alteration of an area of interest can appear in a variety of degrees of importance and clarity, heretofore only qualitatively assessed.

SUMMARY OF THE INVENTION

The disclosure provided herein relates to methods and systems for the generation of a numerical index, or plurality of indices, characterizing the magnitude of importance and the level of focused definition of an observable attribute of an area of interest, which, in aggregate, characterize the significance of the attribute. Particularly, the methods and systems disclosed herein relate to novel techniques for assimilating quantitative and/or qualitative input from observers of an area of interest, attributed by observable informative event items characterizing said area of interest. Event items may include, but may not be limited to, news sources, publications, and social media content. Additionally, the input may be transformed into a numerical index, or plurality of indices, reflecting the clarity and importance of events communicated by those informative items.

The methods and systems disclosed herein may be applicable in areas of interest such as evaluating the characteristics of corporate behavior and performance as traditionally and conventionally only characterized heretofore by standardized financial data and metrics. Furthermore, the methods and systems disclosed herein may be applicable in areas of interest that can be attributed by news articles consumable by an observant public, and/or where members of that public have varying degrees of expertise.

It is the object of the methods and systems disclosed herein to quantify the import degree of observable alterations within an area of interest as the alterations occur over time. It is also the object of the methods and systems disclosed herein to additionally provide a method and a system for quantifying the degree of clarity for characterizing observable alterations within an area of interest. It is a further object of the methods and systems disclosed herein to combine the import degree with degree of clarity to produce a degree of significance.

The methods and the systems as disclosed herein may center around the innovative concept of processing, as input, measurements of content attributes from informative entities, such as news articles, reports, and expert opinions over a continuum of time, resulting in derivative measurements of importance, clarity, and their combinations indicating significance.

The methods discussed herein may be particularly suited for, although not limited to, areas of interest comprising corporations with publicly observed qualitative behavior. In some embodiments, methods discussed herein may be particularly suited for one or more asset classes including bonds, mutual funds, exchange traded funds (ETF's), sovereign bonds, and real estate. Methods discussed herein may work on areas of interest where there's a content-driven characteristic measurement available over a given period of time. For example, other areas where methods discussed herein may be used may include sports predictions, sports analysis, electoral politics analysis, and/or election prediction.

In a first aspect, a method of identifying meta-events is provided. The method comprises receiving a plurality of event items over a given period of time. Each event item may be keyed to a point in time within the given period of time. Additionally, the method comprises analyzing the plurality of event items to determine one or more areas of interest. The method also comprises measuring at least one of 1) a number of event items within a particular area of interest within a given time period, 2) precision of a number of event items within a particular area of interest within a given time period, 3) accuracy of event items within a particular area of interest within the given time period, and 4) magnitude of the items within a particular area of interest within a given time period. Additionally, the method comprises comparing the measured event items within the particular area of interest within the given time period against a measured number of event items within the particular area of interest within a previous time period. Further, the method comprises determining that a meta-event has occurred when the difference between the measured number of event items within the particular area of interested compared to the measured number of items within the particular area of interest within a previous time period exceeds a threshold measure of the events.

In another aspect, a method of generating a signal that illustrates occurrence of meta-events associated with a particular area of interest is provided. The method comprises receiving a plurality of event items over a given period of time, wherein each event item is keyed to a point in time within the given period of time, and wherein each event item is associated with a sentiment point score within a particular area of interest. The method also comprises measuring at least three of 1) a number of event items within the particular area of interest within the given time period, 2) precision of the items within the particular area of interest within the given time period, 3) accuracy of the items within the particular area of interest within the given time period, and 4) magnitude of the change in the sentiment point score associated with the items within the particular area of interest within the given time period. Additionally, the method comprises generating a signal based on the at least three measurements. The method further comprises displaying the signal as a function of time on a graphical user interface. Additionally, the method comprises annotating the signal to illustrate meta-event peaks that exceed a threshold, wherein said meta-event peaks are modified to add a boundary line at a nearest valley or zero crossing at the beginning of each meta-event peak and to add a boundary line at a nearest valley or zero crossing at the end of each meta-event peak.

In a further aspect, a method of identifying events associated with meta-events is provided. The method comprises receiving a plurality of event items over a given period of time, wherein each event item is keyed to a point in time within the given period of time, and wherein each event item is associated with a sentiment point score within a particular area of interest. The method also comprises measuring at least three of 1) a number of event items within the particular area of interest within the given time period, 2) precision of the number of items within the particular area of interest within the given time period, 3) accuracy of the number of items within the particular area of interest within the given time period, and 4) magnitude of the items within the particular area of interest within the given time period. Additionally, the method comprises generating a signal based on the at least three measurements, wherein the signal is generated as a function of time. The method further comprises identifying a peak within the signal that is above a particular height, wherein said peak is associated with a meta-event. The method also comprises determining a plurality of events within a time period associated with the identified peak. Further, the method comprises analyzing, using natural language processing methods, the plurality events to determine which events are above a threshold of familiarity to each other, thereby identifying a set of events associated with a meta-event.

Another aspect of the invention provides a method of generating a signal that illustrates occurrence of meta-events associated with a particular area of interest. The method comprises receiving a plurality of event items over a given period of time, wherein each event item is keyed to a point in time within the given period of time, and wherein each event item is associated with a sentiment point score within a particular area of interest. The method also comprises measuring one, or a combination, of 1) a number of event items within the particular area of interest within the given time period, 2) numerical closeness of the sentiment point score associated with each of the items within the particular area of interest within the given time period, 3) textual similarity of the items within the particular area of interest within the given time period, and 4) magnitude of the change in the sentiment point score associated with the items within the particular area of interest within the given time period. Additionally, the method comprises generating a signal based on one, or a combination of, the measurements. The method also comprises displaying the signal as a function of time on a graphical user interface. Further, the method comprises annotating the signal to illustrate meta-event peaks that exceed a threshold, wherein said meta-event peaks are modified to add a boundary line at a nearest valley or zero crossing at the beginning of each meta-event peak and to add a boundary line at a nearest valley or zero crossing at the end of each meta-event peak.

A further aspect of the invention provides a method of identifying events associated with meta-events. The method comprises receiving a plurality of event items over a given period of time, wherein each event item is keyed to a point in time within the given period of time, and wherein each event item is associated with a sentiment point score within a particular area of interest. The method also comprises measuring one, or a combination, of 1) a number of event items within the particular area of interest within the given time period, 2) numerical closeness of the sentiment point score associated with each of the items within the particular area of interest within the given time period, 3) textual similarity of the items within the particular area of interest within the given time period, and 4) magnitude of the change in the sentiment point score associated with the items within the particular area of interest within the given time period. Additionally, the method comprises generating a signal based on one, or a combination of, the measurements, wherein the signal is generated as a function of time. Further, the method comprises identifying a peak within the signal that is above a particular height, wherein said peak is associated with a meta-event. The method also comprises determining a plurality of events within a time period associated with the identified peak. The method also comprises analyzing, using natural language processing methods, the plurality events to determine which events are above a threshold of familiarity to each other, thereby identifying a set of events associated with a meta-event.

In some embodiments, an identified peak is associated with more than one meta-event. In some embodiments, a set of events associated with a meta-event is presented as a list. In some embodiments, a set of events associated with a meta-event is presented as textual excerpts from each event that is associated with the meta-event.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the invention will be obtained by reference to the following detailed description that sets forth illustrative embodiments, in which the principles of the invention are utilized, and the accompanying drawings of which:

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

In some embodiments, systems and methods provide crowd-based sentiment indices. Various aspects of the systems and methods described herein may be applied to any of the particular applications set forth below or for any other types of feedback. The systems and methods may be applied as a standalone device, or as part of an integrated online valuation system. It shall be understood that different aspects of the invention can be appreciated individually, collectively, or in combination with each other.

Overview

Methods and systems are provided for generating a numerical index, or a plurality of indices, quantifying the importance and clarity of an observable alteration or change within an area of interest.

Methods and systems as described herein may be preferably designed to provide observers with precise numerical representations of the most current possible significance metrics associated with an area of interest, in addition to a temporal history of such a numerical representation over arbitrary, selectable ranges of time. As discussed herein, "significance" and "salience" may be used to describe similar concepts. As such, when aspects of the invention describing significance are discussed, they may also be described as relating to salience. Similarly, when aspects of the invention describing salience are discussed, they may also be described as relating to significance.

Various functions and methods described herein may be preferably embodied within software modules executed by one or more devices possessing general purpose computing capabilities, including, but not limited to, general purpose computers, mobile "smart" phones, tablet computers, or any device possessing a Von Neumann computer architecture. A preferred embodiment may include computing devices presenting output on visual display units, with a further preference being those with input touch capabilities. In certain preferred cases, some of the various functions and methods described herein can be embodied within hardware, firmware, or a combination or sub-combination of software, hardware, and firmware.

Significance Metrics

Figure 1:
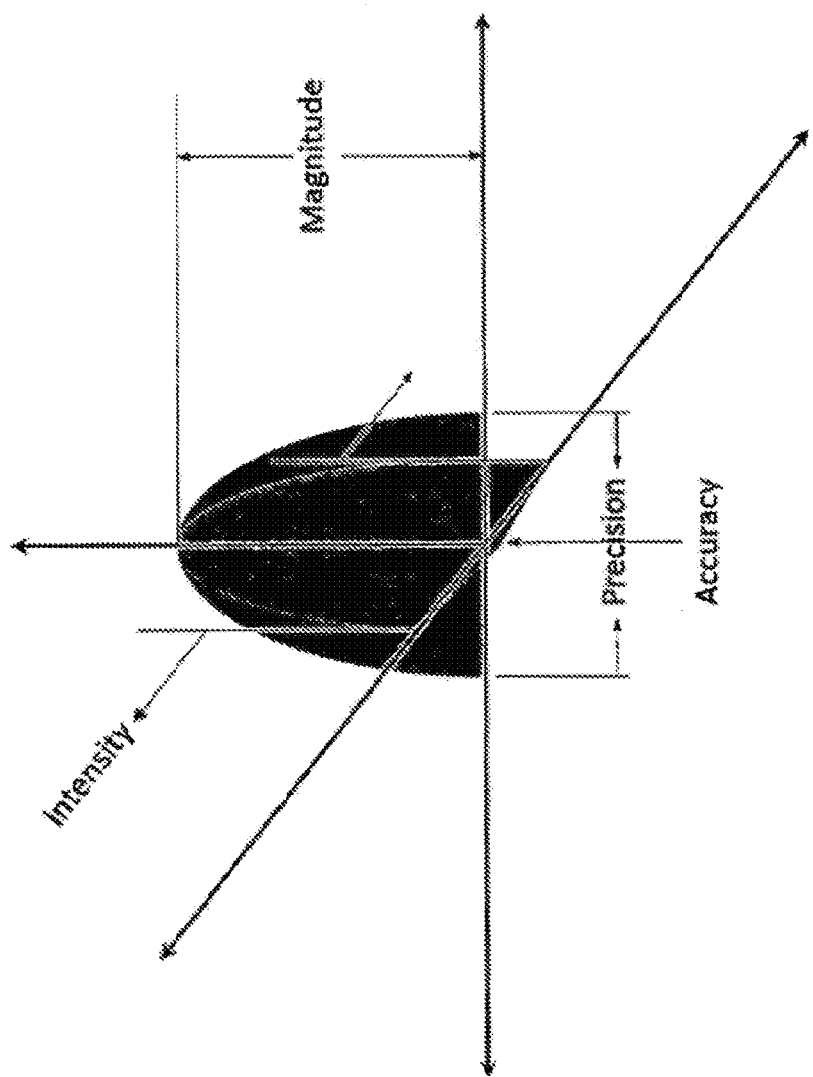
FIG. 1 illustrates relationships of input measurements applied to produce a significance value measuring the importance and clarity of events and observable alterations in an area of interest, in accordance with embodiments.

FIG. 1 illustrates relationships of input measurements applied to produce a significance value measuring the importance and clarity of events and observable alterations in an area of interest, in accordance with embodiments. In particular, FIG. 1 may illustrate a preferred embodiment of the invention comprising a measurement or metric quantity that numerically indicates significance of an observable attribute in an area of interest through combination of four independent input metrics determined from a set of constituent content items $\{c_1, \ldots c_n\}$ in the area of interest that may include magnitude; intensity; precision; and accuracy.

In some embodiments, magnitude may be an observable primary size attribute. Magnitude may be preferably characterized by a quantifiable, positive-directed, change in a characteristic or characteristics of an attribute in an area of interest as indicated by the constituent content items.

In some embodiments, intensity may be an observable secondary size attribute. Intensity may be preferably characterized by a quantifiable, positive-directed, measurement of the volume or count of constituent content items contributing to the primary size attribute, Magnitude.

In some embodiments, precision may be an observable primary clarity attribute. Precision may be preferably characterized by a quantifiable, positive-directed, measurement of metric similarities of the constituent content items contributing to the primary size attribute, Magnitude.

In some embodiments, accuracy may be an observable secondary clarity attribute, preferably characterized by a quantifiable, positive-directed, measurement of the semantic similarities of the constituent content items contributing to the primary size attribute, Magnitude.

The input metrics above may be preferably combined in a mathematical manner so as to produce a single positive-directed aggregate metric. In some embodiments, input metrics that are provided into mathematical function(s) may comprise measures of particular characteristics such as textual commonalities, geo-location, and other relationships of content to each other as well as to a particular user that is requesting and/or generating an analysis.

A preferred embodiment for such a combination may be a linear combination with positive weighting coefficients:

$$S_I \equiv \text{Significance Index}$$
$$\equiv w_M M(c_1, \ldots c_n) + w_I V(c_1, \ldots c_n) + w_P P(c_1, \ldots c_n) + w_A A(c_1, \ldots c_n)$$

An alternative embodiment for such a combination may be a product combination with positive weighting coefficients:

$$S_I \equiv \text{Significance Index}$$
$$\equiv [w_M M(c_1, \ldots c_n)][w_I V(c_1, \ldots c_n)]$$
$$[w_P P(c_1, \ldots c_n)][w_A A(c_1, \ldots c_n)]$$

where, in the above:

$M(c_1, \ldots c_n) \equiv$ Magnitude measurement function of the constituent content items $V(c_1, \ldots c_n) \equiv$ Intensity measurement function of the constituent content items $P(c_1, \ldots c_n) \equiv$ Precision measurement function of the constituent content items $A(c_1, \ldots c_n) \equiv$ Accuracy measurement function of the constituent content items Provided below is a calculation from a snapshot in time where some content events have been gathered within a time sampling window (that will be described further and set in temporal motion in the subsequent section).

For a given category or overall for a given company:

$[t_s, t_f] \equiv$ time sampling window $\{c_1, \ldots, c_n\} \equiv$ set of content events within the time sampling window related to the category (or overall), with the minimum n needed to compute a nonzero Salience value is 3 in the current implementation.

$t(c_i) \equiv$ time stamp of $i^{th}$ content event within the time sampling window $s(t) \equiv$ Content assessment score at time t $r(c_i) \equiv$ sentiment rating of the $i^{th}$ content event within the time sampling window $Q(c_i) \equiv$ numerically comparable representation of the headline text of the $i^{th}$ content event within the time sampling window.

For calculation of a magnitude component, for the given category or overall for a given company, is computed as:

$$M(c_1, \ldots c_n) = f_M(\max(s(t(c_1)), \ldots, s(t(c_n))) - \min(s(t(c_1)), \ldots, s(t(c_n))))$$

yield to magnitude where $f_M$ is a positively directed function in general. In particular for the current implementation of a significance score, the function is simply the identity (multiply by 1).

For calculation of an intensity component, for the given category or overall for a given company, is computed as:

$$I(c_1, \ldots c_n) = f_I(|\{c_1, \ldots, c_n\}|) = f_I(n)$$

to yield Intensity where $f_I$ is positively directed function in general. In particular for the current implementation of a significance score, the function is simply the identity (multiply by 1).

A precision input is a positive function of the numerical proximity of the sentiment ratings of news content events for the given category (or overall) within the time sampling window.

The general case for the overall (versus the per-category) case will be first discussed, and the per-category case will then be discussed, as it is the single dimensional case of this more general one.

For a given category or overall for a given company, given:
m=number of categories
$R(c_i) \equiv [r_{i,1}, \ldots, r_{i,m}] \equiv$ vector of sentiment ratings for the $i^{th}$ content event in the respective categories, with provisions that some components can be null.

Compute:

$$C(c_1, \ldots c_n) \equiv \frac{1}{n}\sum_{i=1}^{n} R(c_i) \equiv \text{centroid } \bar{d} =$$

$$\frac{1}{n}\sum_{i=1}^{n} \|R(c_i) - C(c_1, \ldots c_n)\| \equiv \text{mean distance to centroid } P(c_1, \ldots, c_n) =$$

$$\begin{cases} 0, \text{ if } n < 2 \\ \text{otherwise:} \begin{cases} 100, \text{ if } \bar{d} = 0 \\ \text{otherwise:} \begin{cases} 100, \text{ if } 1/\bar{d} \geq 1.01 \\ \text{otherwise:} 1/(1.01 - 1/\bar{d}) \end{cases} \end{cases} \end{cases}$$

to yield Precision

In the case where a single category is being analyzed, m=1, and the above is done in the single dimension of the category.

The Accuracy input is a positive function of a numerical measure of the textual similarity of content events for the given category (or overall) within the time sampling window. Initially, textual similarity measurements may be applied to the headlines. In some embodiments, body content may be addressed later. In some embodiments, textual similarity measurements may be applied to portions of, or to the entirety of, each content event.

For a given category or overall for a given company, compute:

$\theta(c_1, \ldots c_n) \equiv$ textual similarity index among content event items: ranges in betterness from 0 to 1.

$$A(c_1, \ldots c_n) = \begin{cases} 1/(1.01 - \theta(c_1, \ldots c_n)) \text{ if } \theta(c_1, \ldots c_n) > 0 \\ \text{otherwise } 0 \end{cases}$$

to yield Accuracy.

In a preferred embodiment, the textual similarity score is computed using a modification of the known Vector Space Model technique. The goal is to produce a number that characterizes the similarity of strings of words in a collection. The approach here is to produce, for each string or document, a "document vector", which is a point in a multidimensional space, spanned by the universe of words in all the documents being considered (in this application, typically news headlines). A "centroid" vector is then found by averaging all the coordinates of the document vectors. The average cosine is then computed between each document vector and that centroid as the textual similarity value for the collection.

In some embodiments, a significance score is computed as a weighted sum of the above four inputs, for a given category (or overall) for a given company. In an example of computing a significance score, computations may be performed as follows:

$$S_I(c_1, \ldots, c_n) \equiv [w_M M(c_1, \ldots, c_n) + w_I I(c_1, \ldots, c_n) +$$

$$w_P P(c_1, \ldots, c_n) + w_A A(c_1, \ldots, c_n)]/[w_M + w_I + w_P + w_A]$$

where M, I, P, A are computed as above and the weights are currently set thusly:
$w_M = 2$
$w_I = 5$
$w_P = 5$
$w_A = 1$ Note in this embodiment, the weights are also normalized. While the setting of the weights described in this embodiment is a preferred embodiment, additional embodiments may have different settings.

Other mathematical possibilities may also be valid, with the specified mathematical property being that positive changes in the input metrics yield positive changes in the output aggregate metric. For example, mathematical functions may be used that yield positive movement when inputs to the mathematical function(s) move positively.

Significance Signal

Figure 2:
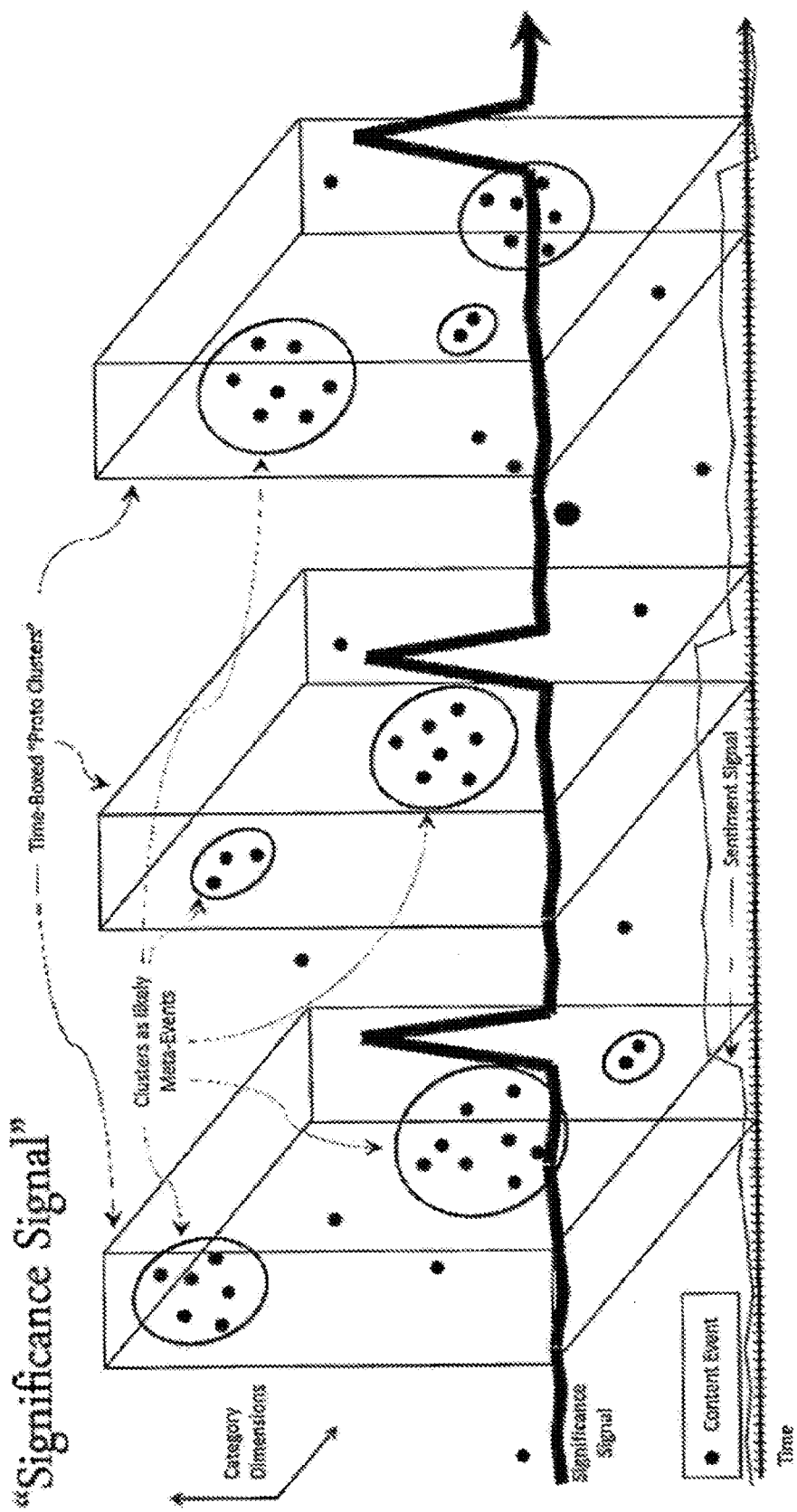
FIG. 2 illustrates deriving a significance signal representing the importance and clarity of events and observable alterations in an area of interest as they move through time, in accordance with embodiments.

FIG. 2 illustrates deriving a significance signal representing the importance and clarity of events and observable alterations in an area of interest as they move through time, in accordance with embodiments. In particular, FIG. 2 may illustrate an additional preferred embodiment of the invention wherein the measurement or metric quantity that measures significance is generalized to be calculated continually as a function of time. This is taught by computing the four input metrics, as described above, over successive intervals of time and then using those input metrics to compute the significance index in each such successive interval. Within such intervals of time, each input metric is determined as a function of the set of content items $\{c_1, \ldots c_n\}|_{\tau_s}^{\tau_f}$ associated with points in time within the time interval $[t_s, t_f]$.

When the sampling window is set in motion over time, with a significance score calculation performed for each new position of the window, a continuous function of time ensues, and this function of time is the Significance Signal.

Some of the symbols used to describe the significance signal will be those defined above when defining the significance score, and they will be referenced here as well. Generating a significance signal may involve setting the significance scores into temporal motion, yielding points along a timeline. This may be done by way of moving a sampling time window along a timeline and applying the above significance score calculation for each window populated along the timeline. The significance signal value at a point in time would then be the significance score computed within the time window looking back from that point in time by a fixed window interval, such as three days.

For a given category or overall for a given company:
$[T_s, T_f]$≡overall time interval over which the Salience Signal is to be generated
$\Delta t_i$≡time increment for sampling, currently set to one day
$\Delta t_w$≡length of moving time window, currently 3 days
$N_T$≡number of time windows present in $$[T_s, T_f] = \lfloor (T_f - T_s)/\Delta t_i \rfloor,$$

where the number of windows is the same as the number of increments, rather than the number of window lengths that fit into the overall interval, because the windows can overlap each other as they advance through the interval by the length of the time sampling increment.

$$\{[t_{k,s} \equiv T_s + k\Delta t_i - \Delta t_w, \; t_{k,f} \equiv T_s + k\Delta t_i]\}_{k=1}^{N_T} \equiv$$

series of backward-looking time windows with end-times being increments through the overall time interval $[T_s, T_f]$ $$\{\{c_{k,1}, \ldots, c_{k,n_k}\}\}_{k=1}^{N_T} \equiv$$

series of collections of content event items with timestamps within their respective time window, found for a given time window in the above time window series $$[t_{k,s}, t_{k,f}] \text{ as } \forall \; c_{k,i} \ni t_{k,s} \leq t(c_{k,i}) \leq t_{k,f}$$

Compute:

$$\{S_I(c_{k,1}, \ldots, c_{k,n_k})\}_{k=1}^{N_T} \equiv$$

series of salience points along the overall time interval, computed for each item using the above Salience Index calculation.

For brevity, this series can be shortened to $$\underline{S} \equiv \{S(t_k)\}_{k=1}^{N_T},$$

where the $t_k$ are the original end-points of the sampling windows used to generate a significance series. This will represent the time series of significance along the interval. For graphical purposes, these will be the points connected above a time axis to render a significance signal on a chart, for example. This series may also be used to compute statistics upon it as well, which will be detailed in a subsequent section.

An example of an implementation of the significance signal calculations is described. As described above, a sampling window is moved along through the overall time interval at fixed increments and a backward-looking window is established, also of fixed length, into which content events within the window's temporal bounds are collected and analyzed for their significance score, which is then appended to the time series that is the significance signal. The sampling window of fixed length is moved along at fixed increments (usually the length is greater than the increment, for example 3-day length and 1-day increment). Within that fixed length at that position in time, the events are collected. Following the collection of content events within the sampling window, the significance score is calculated as described in its section above.

Relationships Between Measurements

Figure 3:
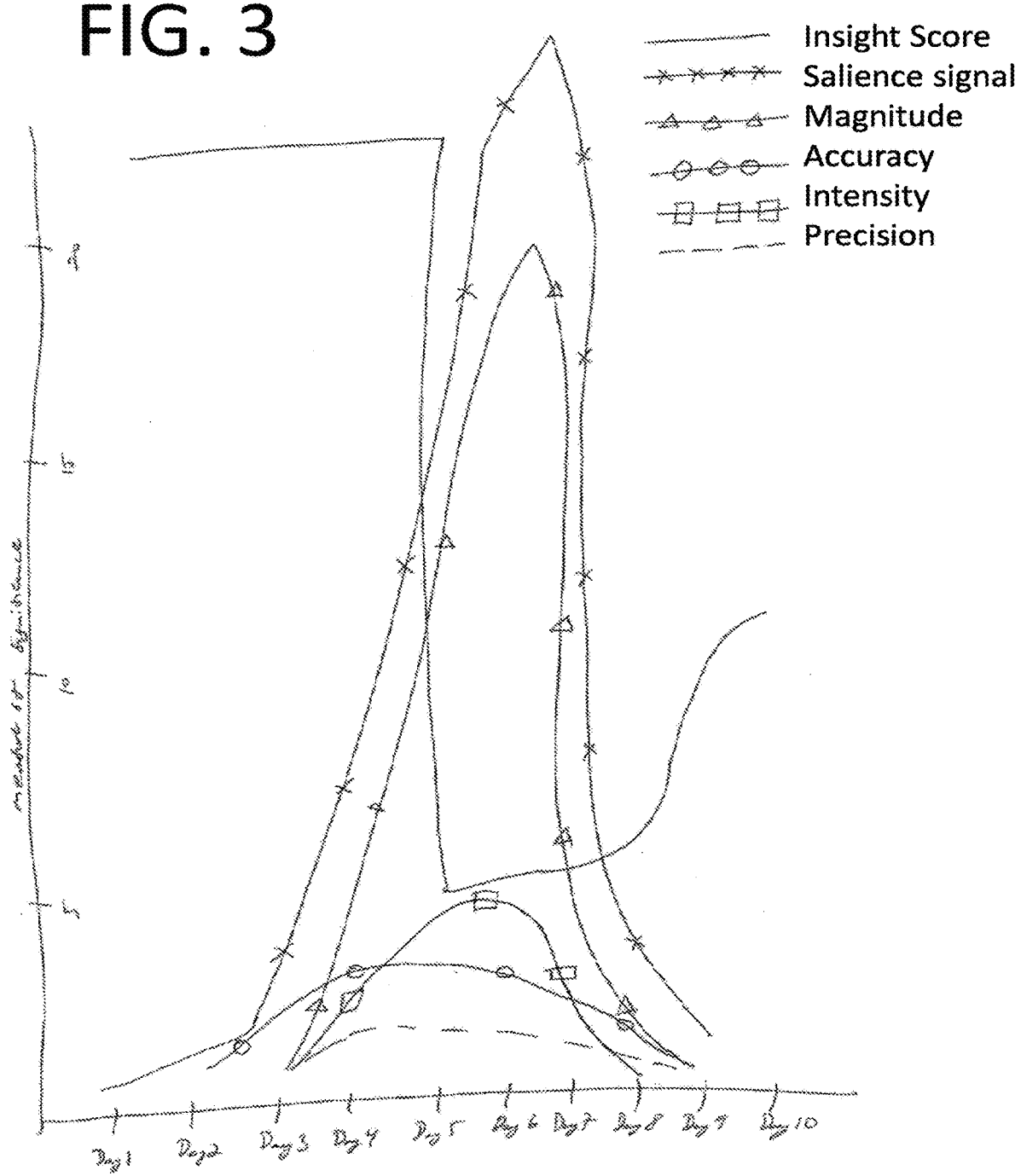
FIG. 3 illustrates an example of relationships between measurements of a combination of four independent input metrics determined from a set of constituent content items in the area of interest, in accordance with embodiments.
Figure 5:
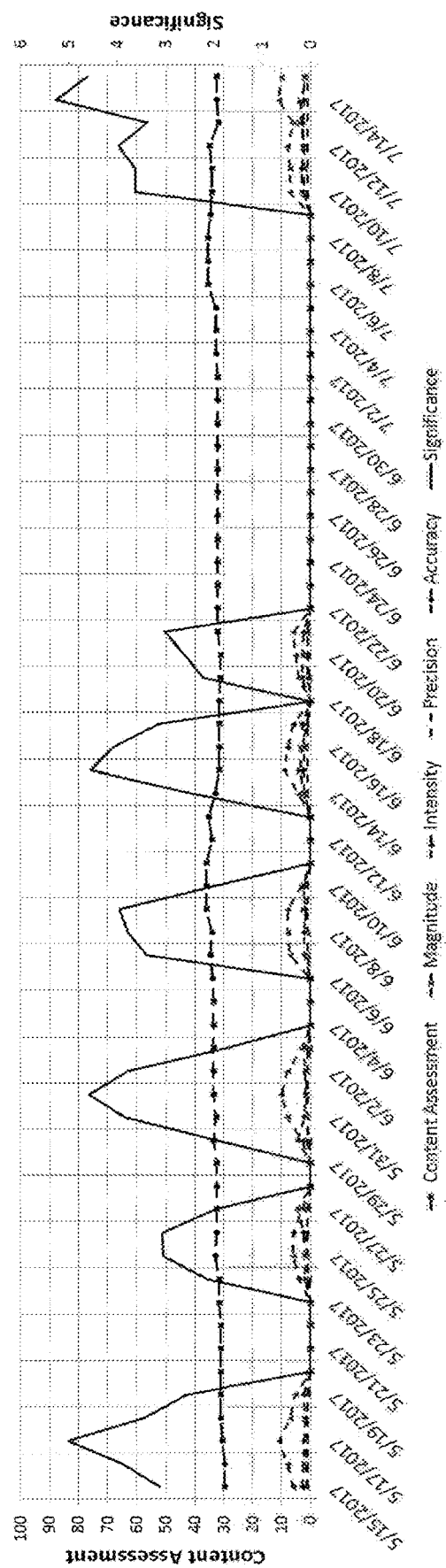
FIG. 5 also illustrates an example of relationships between measurements of a combination of four independent input metrics determined from a set of constituent content items in the area of interest, in accordance with embodiments.

FIG. 3 illustrates an example of relationships between measurements of a combination of four independent input metrics determined from a set of constituent content items in the area of interest, in accordance with embodiments. In particular, FIG. 3 illustrates a measure of characteristics that may be used to determine an initiation of a meta-event. A measure of characteristics, as used herein, may comprise measures of a plurality of events or other characteristics that may be of interest. A meta-event may occur when a particular characteristic of a series of events is seen to shift suddenly within a short amount of time. In some embodiments, a magnitude may reflect a derivative of a change in a particular characteristic of a plurality of events, such as measured by a measure of characteristics. FIG. 5 also illustrates an example of relationships between measurements of a combination of four independent input metrics determined from a set of constituent content items in the area of interest, in accordance with embodiments. In particular, FIG. 5 illustrates relationships between content assessment, magnitude, intensity, precision, accuracy, and significance.

Figure 4:
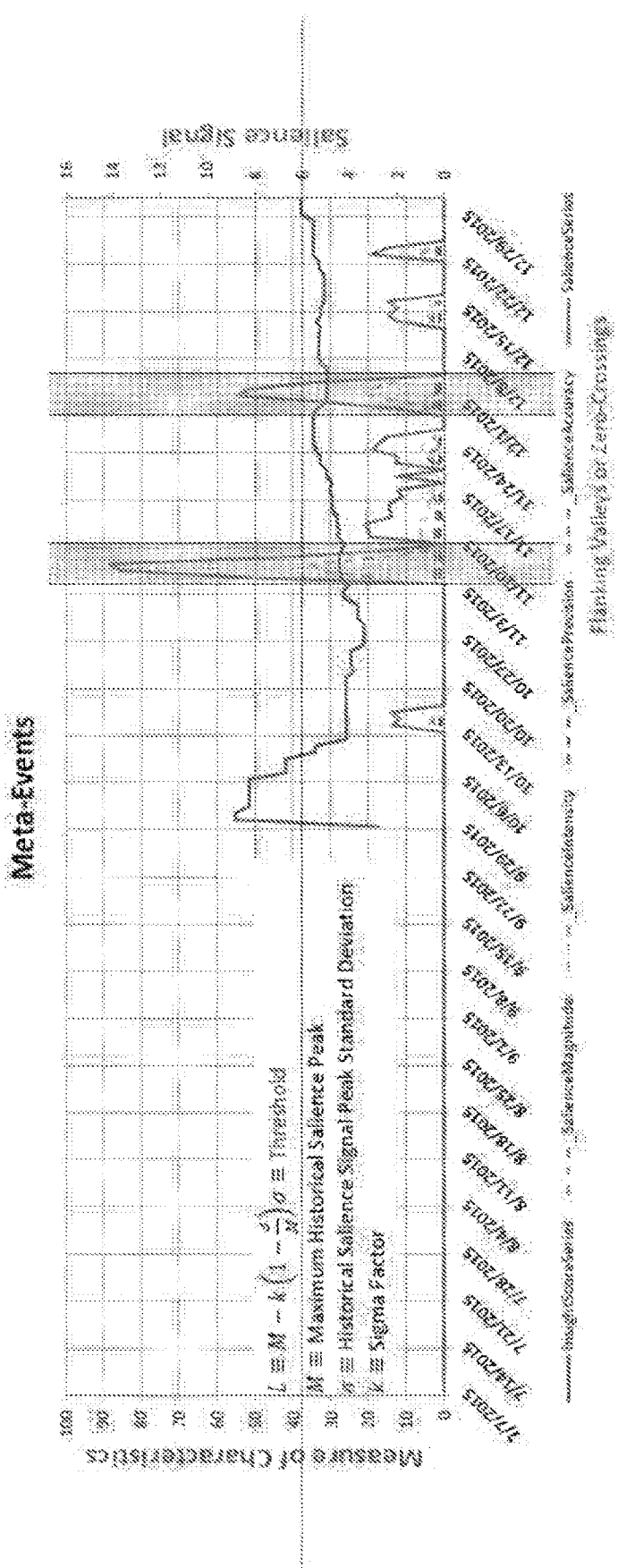
FIG. 4 illustrates a schematic that may be used for finding bounds of a meta-event, in accordance with embodiments.

The determination of a magnitude shift may be combined with additional embodiments of a change in measures of the characteristics of a plurality of events, such as including changes in secondary factors. As discussed above, secondary factors may include a measure of accuracy, precision, and intensity of a plurality of events. In some embodiments, a combination of measurements associated with a particular plurality of events may be combined to calculate a salience score. A salience score may be used to determine bounds of a particular meta-event. This is illustrated in FIG. 4, which provides a schematic that may be used for finding bounds of a meta-event. In particular, FIG. 4 illustrates a threshold line that is determined using the equation provided in FIG. 4. In particular, the maximum historical salience peak as provided in the equation in FIG. 4 may refer to a historical maximum over a time period that covers a historical time period. In additional embodiments, other formulas may be used to determine other thresholds of interest. In particular, thresholding may be based on historical statistics of the salience signal, but may not necessarily be limited to the equation provided in FIG. 4. The historical time period may include the time period that includes any known content associated with the particular measured characteristic. Historical periods may include the entire duration for which content events are present for an area of interest. In some embodiments, historical periods may usually include the entire duration for which content events are present for an area of interest. In some embodiments, historical periods may include company news history running over a series of consecutive years.

Once the threshold line has been calculated using the equation as seen in FIG. 4, any salience peaks that fall below the threshold line will be disregarded. In contrast, any salience peak(s) that meet or exceed the threshold are considered to be part of a meta-event.

Additionally, meta-event boundaries may be flanking boundaries or zero crossings. Some embodiments of meta-event boundaries are illustrated in FIG. 4. In some embodiments, meta-event boundaries may be located at the nearest flanking dips in a significance signal. In some embodiments, meta-event boundaries may be located at the nearest zero crossings. In some embodiments, meta-event boundaries may be located at a nearest local minimum relative to a corresponding peak. In some embodiments, a location or locations or meta-event boundaries may be based on the nearest local minimum relative to a peak. In some embodiments, meta-event boundaries may be located with respect to a corresponding peak. The generation of these meta-event boundaries may be called autofencing. AutoFencing application of Salience, and more particularly, the Salience Signal and Salience Statistics, is the ability to identify bounds in the underlying content assessment score series that contain contributing content news items which signify potentially important events in a company's narrative. The bounds can then be articulated independently of the underlying signals used to generate them. As seen in FIG. 4, the AutoFence boundaries and regions are represented by the blue zones bounded by the red vertical lines flow. Peaks may refer to local maxima within a given time series. Peaks may refer to local maxima with a portion of a given time series. Dips may refer to local minima within a given time series. Dips may refer to local minima within a portion of a given time series.

Figure 6:
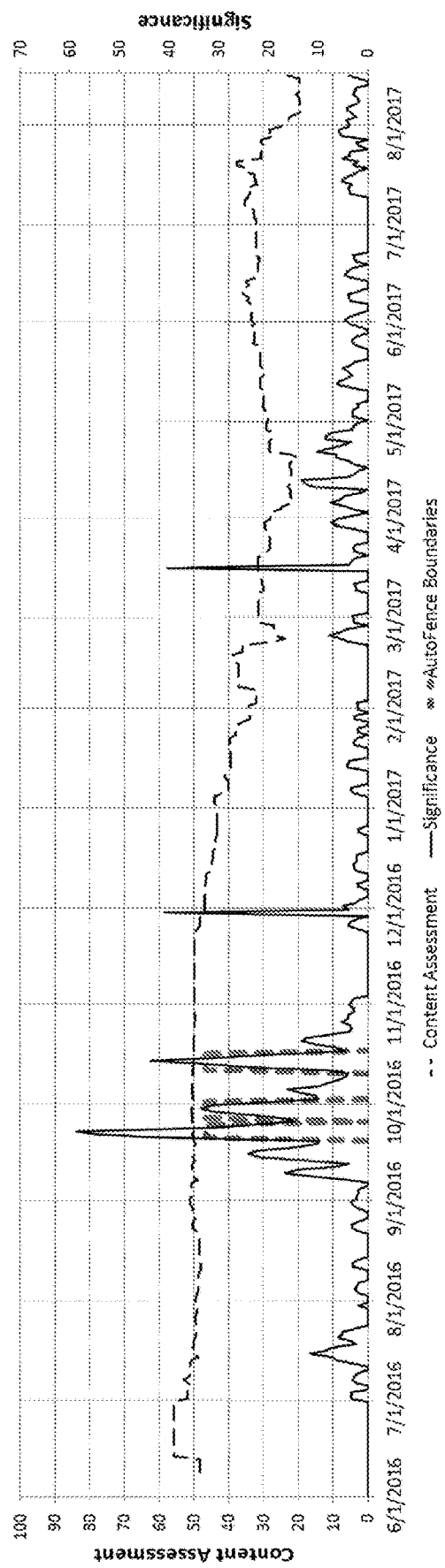
FIG. 6 also illustrates a schematic that may be used for finding bounds of a meta-event, in accordance with embodiments.

FIG. 6 also illustrates a schematic that may be used for finding bounds of a meta-event, in accordance with embodiments. In particular, FIG. 6 illustrates a comparison of content assessment, significance, and autofence boundaries in accordance with embodiments discussed herein.

To describe the AutoFencing theory, symbology from prior sections may be referenced here.

For a given category or overall for a given company:

$[t_s, [\tau_f]$ = time interval of interest, "regional", over which the significance signal exists in which AutoFencing is desired.

Compute:

$$\underline{S_\tau} \equiv$$

the Regional Salience Series over $[\tau_s, \tau_f]$ $$\underline{P_\tau}(\underline{S_\tau}) \equiv \{P(t_p)\}_{p=1}^{N_p} \equiv$$

Regional Salience Peaks≡series of local maxima detected over the Regional Salience Series $$\underline{S_\tau} \text{ over } [\tau_s, \tau_f]$$

$$\underline{V_\tau}(\underline{S_\tau}) \equiv \{V(t_v)\}_{v=1}^{N_v} \equiv$$

Regional Salience Valleys≡series of local minima detected over the Regional Salience Series $$\underline{S_\tau} \text{ over } [\tau_s, \tau_f]$$

$$\underline{Z_\tau}(\underline{S_\tau}) \equiv \{t_z\}_{z=1}^{N_z} \equiv$$

Regional Salience Zero Crossings≡series of time points where the Salience Index value touches zero over the Regional Salience Series $$\underline{S_\tau}$$

over $[\tau_s, \tau_f]$ $$\underline{T_\tau}(\underline{S_\tau}) \equiv \{[t_s, t_f]_a\}_{a=1}^{N_a} \equiv$$

Sequence of AutoFence Boundary Time Pairs
which is generated by selecting those peaks from $$\underline{P_\tau}(\underline{S_\tau})$$

that exceed L, taking their time point, $t_p$, and finding the closest flanking time points $t_v$ or $t_z$ from $$\underline{V_\tau}(\underline{S_\tau}) \text{ and } \underline{Z_\tau}(\underline{S_\tau})$$

——that is, the nearer valley or zero crossing to both the left and the right of $t_p$—and then taking the time points of those to be the AutoFence boundary pair for that particular selected peak.

In an example, a series of data may be received that includes a plurality of event items. Initially, the event items may be categorized into one or more particular categories. Within a category of event items, each event item may have particular data associated with the event. In particular, each event item may have an area of scoring, a title, and an additional relationship characteristic that contextualizes the event item with respect to other events occurring across a particular time period.

Events may be placed within a category that is predefined. For example, around baseball season a category may be generated that relates to the Boston Red Sox. Event items, such as news events, publications, and/or social media content, that is associated with the Boston Red Sox may be filtered into this particular category. When a series of events centers around a meta-event, such as the Boston Red Sox winning the World Series, a change in a characteristic that contextualizes the event may be determined. For example, a change in magnitude may be assessed across event items as seen across a given time period. Once the change in magnitude has occurred, the meta-event may be assessed by counting the number of occurrences of a plurality of event items (e.g., intensity), commonality of scoring of a plurality of event items (e.g., precision), and/or similarity between titles of a plurality of event items (e.g., accuracy). These measures may be brought together to determine a particular report associated with the meta-event associated with the Boston Red Sox.

In additional embodiments, events may be placed within a category that is newly generated. For example, a number of news stories may be found to relate to a combination of words and/or event item origin that indicates the events may be associated with a meta-event. An example may be a series of emerging news stories, publications, and/or social media content related to an emerging food trend, such the invention of as croissant donuts ("cronuts"). Such trends may be of interest to consumers who are following popular restaurants or food blogs. As such, once a popular food trend is identified, followers of a particular type of company and/or social media site may receive an alert or notification related to the new food trend.

As the intervals advance through time, for each may be used to compute the significance index. These computations may result in a time-correspondent series of significance metrics, producing a "Significance Signal", as a function of time.

The above method can be applied to cases with intervals of time either overlapping or non-overlapping, with each significance signal point mapped in time to any chosen point within each interval, representing the contribution to the signal at that point in time.

A further preferred embodiment teaches the introduction of time intervals within wider time intervals containing them, with the signal value of the wider time intervals being a result of a combining function of the signal values of each of the intervals contained within each wider interval. The combining function can be any mathematical function with the property that positive changes in the subordinate interval signal values lead to positive changes in the combining functional result signal value. Examples, although not limiting, of such combining functions may include sums, products, arithmetic means, and geometric means.

An accompanying embodiment can be taught wherein the curvilinear properties of the Significance Signal are analyzed using known mathematical techniques to detect peaks and valleys in the signal and cross referencing the relationships between such features based on the underlying commonality of the input metrics used to derive the signal. In such a manner, "episodes" or event "pre-shocks" or "aftershocks" can be extracted and communicated to consumers of this information. Further, durations of such events, or collections of such events, characterized by such features in the Significance Signal, can be presented to such consumers as well.

An additional preferred embodiment may teach the use of the measurements on the underlying content items being associated with observed social sentiment communicated within the content items, related to one or multiple attributes or categories within an area of interest. Such content items can include, yet are not limited to: news items, government "watchdog" agency reports, general government reports, independent "watchdog" organization reports, SEC filings, web logs ("blogs"), and socially-driven reporting websites (e.g. "GlassDoor.com"). A particular preferred embodiment of the invention employing this approach is taught as follows:

For a particular category, for a particular area of interest, with content items being headlined news articles distributed over time:

$$S_F \big|_{t_s}^{t_f} \equiv \text{Significance Factor for a time window}[t_s, t_f] \equiv \frac{S_I \big|_{t_s}^{t_f}}{S_I \big|_{T_s}^{T_f}}$$

where:

$$S_I \big|_{\tau_s}^{\tau_f} \equiv \text{Significance Index for a time range}[\tau_s, \tau_f] \equiv$$

$$\sum_{d=1}^{D} \left[ w_{I,d}(|\Delta I_d|) + w_{V,d}(V_d) + w_{R,d}(R_d)^{-1} + w_{H,d}(H_d) + w_{A,d}(A_d) \right]$$

$d \in \{1 \ldots D\} \equiv$ Index in sequence of D sub-time-windows of progressively larger durations contained within the overall time window and all starting at the beginning of the time range $[\tau_s, \tau_f]$ $|\Delta I_d| \equiv$ Magnitude $\equiv$ Maximum magnitude of sentiment score change within the $d^{th}$ sub-time-window $V_d \equiv$ Intensity $\equiv$ Volume (count of scoring events) within the $d^{th}$ sub-time-window $R_d \equiv$ Precision $\equiv$ Categorical cluster radius of article sentiment scores within the $d^{th}$ sub-time-window $H_d \equiv$ Accuracy component 1 $\equiv$ Average lexicographical similarity between all headline pairs within the $d^{th}$ sub-time-window $A_d \equiv$ Accuracy component 2 $\equiv$ Average lexicographical similarity between all article pairs within the $d^{th}$ sub-time-window $w_{\{I,V,R,HA\},d} \equiv$ Weighting factors for the $d^{th}$ sub-time-window (default all initially to unity until further experimental tuning).

For the long range historical baseline (when $[\tau_s, \tau_f] = [T_s, T_f]$), applicable to the constant denominator in the definitional equation above for the Significance Factor, the above Significance Index calculation is applied sequentially over the entire historical range, statistical analyses are performed and the values used in the above formula for the baseline denominator are statistical thresholds from the mean, measured in standard deviations. This provides for enabling relative significance metrics suitable for each differing area of interest.

Significance Applications

Highlighting of Significance Regimes

Additional embodiments may contemplate gathering events characterized by content items in a temporal neighborhood containing peaking significance indices as described above in the context of AutoFencing. Preferred embodiments of such new event characterizations can include, but are not limited to: lists of textual items from within the content items in the collection within a time region of a significance level above a particular threshold.

Quantitative "Meta-Event" Determination

Once a set of content items in a temporal neighborhood have been gathered, these content items may be assessed to determine relationships between these content items. In particular, when a group of content items are assessed and determined to be similar to one another, this group of content items may be synthesized to form a meta-event.

Some embodiments of assessing content to determine similarity may include the use of natural language processing methods. In some cases, natural language processing methods may be used to find similarity between content items. Based on this similarity, these content items may be synthesized together to form a meta-event. For example, if a number of content items relating to a political speech that occurred in Florida are found, natural language processing methods may be used to identify similar events and combine them into a meta-event.

In some cases, natural language processing methods may be used to find dissimilarities between content items that may otherwise have been linked together. Using the example above related to a Florida political speech, natural language processing methods may initial combine articles related to Florida generally. However, further processing using natural language processing methods may determine that a content item is related to an advertisement for Florida oranges, and has little or no political content. As such, these methods may be used to disassociate the advertisement for Florida oranges from the synthesized content items related to the Florida political speech.

Further embodiments may contemplate reconstituting synthesized content items and their related events into a collective "meta" event comprised of events characterized by content items with similar significance input metrics. Preferred embodiments of such new event characterizations can include, but are not limited to: 1) Lists of textual items from within the content items in the collection possessing a significance level above a particular threshold, and 2) Synthesized paragraphs and prose using the textual items from within the content items in the collection possessing a significance level above a particular threshold.

Qualitative "Meta-Event" Determination

Further embodiments may contemplate reconstituting synthesized content items and their related events into a collective "meta" event comprised of events characterized by content items with textually or lexicographically similar content. Preferred embodiments of such new event characterizations can include, but are not limited to: 1) Lists of textual items from within the content items in the collection possessing a significance level above a particular threshold, and 2) Synthesized paragraphs and prose using the textual items from within the content items in the collection possessing a significance level above a particular threshold.

A preferred embodiment of determining textual or lexicographical similarity can be taught using the Vector Space Model technique known in the literature. Other techniques include Levenshtein Distance and Text Classification using String Kernels.

Synthetic Content Generation

Further embodiments may contemplate reconstituting synthesized content items collected analytically in the process of deriving significance and/or determining meta-events by any or all the above embodiments, wherein the collected content items are lexicographically combined to produce new content items textually encompassing the content items captured through deriving a significance metric of a particular threshold. Preferred embodiments of such new content items can include, but are not limited to: 1) Lists of textual items from within the content items in the collection possessing a significance level above a particular threshold, and 2) Synthesized paragraphs and prose using the textual items from within the content items in the collection possessing a significance level above a particular threshold.

Synthetic generation can be taught using the Synthetic Text Generation for Sentiment Analysis developed by Maqsud and/or other techniques known in the literature to those skilled in the art.

External Signals Correlations

Additional embodiments contemplate the derivation of relationships between significance values and signals, generated by methods and systems described above, with other quantitative information relating also to the content items collected in deriving significance. Applications in this manner include, but are not limited to: 1) Measurable information relating to financial performance in the area of interest of the content items, 2) Measurable sentiment information relating to the area of interest of the content items derived by sources outside the methods and systems described herein, and/or 3) Measurable sustainability information relating to the area of interest of the content items derived by sources outside the methods and systems described herein.

Computer Control Systems

Figure 7:
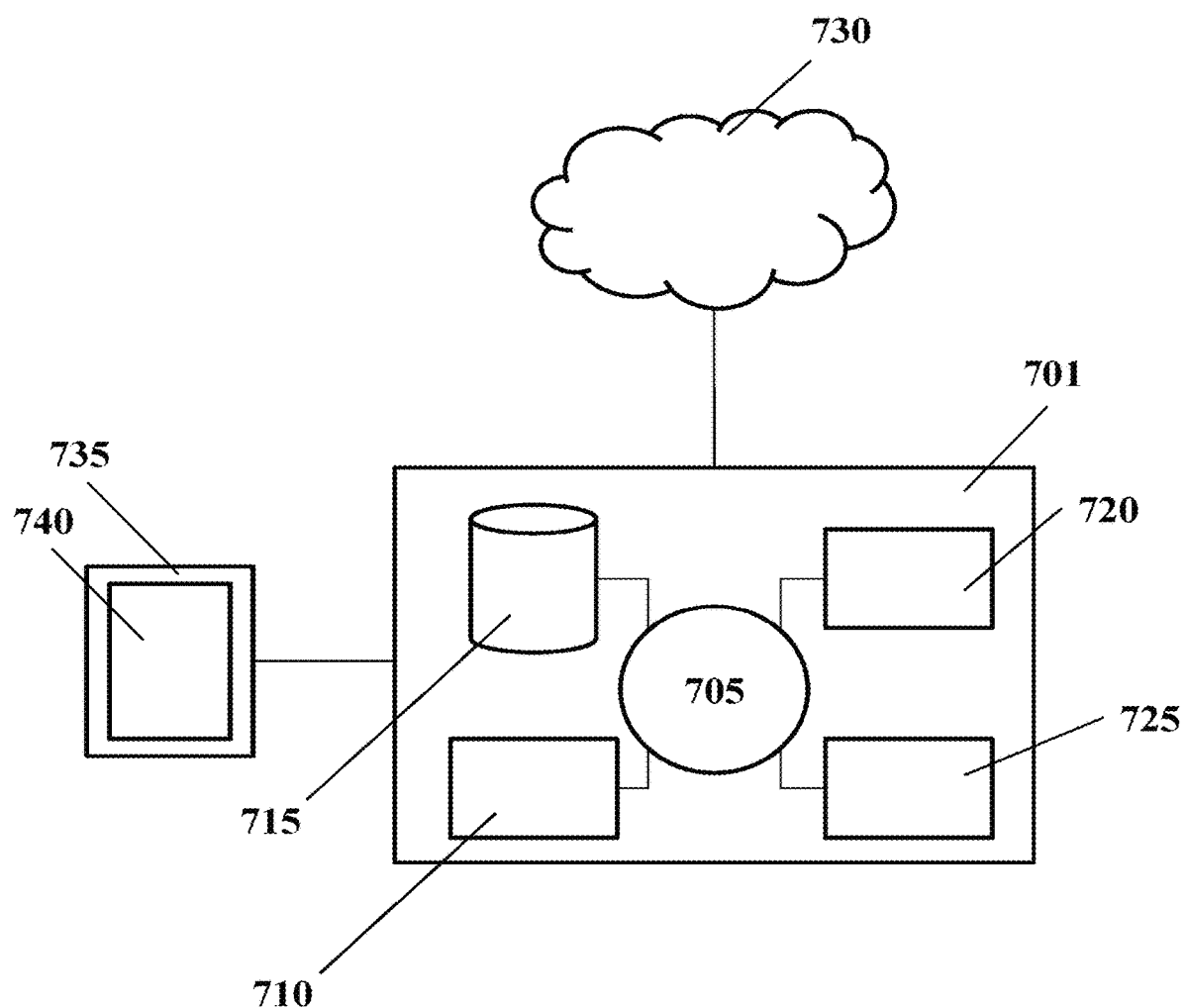
FIG. 7 shows a computer control system that is programmed or otherwise configured to implement methods provided herein.

The present disclosure provides computer control systems that are programmed to implement methods of the disclosure. FIG. 7 shows a computer system 701 that is programmed or otherwise configured to identify meta-events from collection of related information. The computer system 701 can regulate various aspects of detecting meta-events of the present disclosure, such as, for example, characterizing content events, generating a significance signal, and determining the presence of a meta-event based on an assessment of the signal. The computer system 701 can be an electronic device of a user or a computer system that is remotely located with respect to the electronic device. The electronic device can be a mobile electronic device.

The computer system 701 includes a central processing unit (CPU, also "processor" and "computer processor" herein) 705, which can be a single core or multi core processor, or a plurality of processors for parallel processing. The computer system 701 also includes memory or memory location 710 (e.g., random-access memory, read-only memory, flash memory), electronic storage unit 715 (e.g., hard disk), communication interface 720 (e.g., network adapter) for communicating with one or more other systems, and peripheral devices 725, such as cache, other memory, data storage and/or electronic display adapters. The memory 710, storage unit 715, interface 720 and peripheral devices 725 are in communication with the CPU 705 through a communication bus (solid lines), such as a motherboard. The storage unit 715 can be a data storage unit (or data repository) for storing data. The computer system 701 can be operatively coupled to a computer network ("network") 730 with the aid of the communication interface 720. The network 730 can be the Internet, an internet and/or extranet, or an intranet and/or extranet that is in communication with the Internet. The network 730 in some cases is a telecommunication and/or data network. The network 730 can include one or more computer servers, which can enable distributed computing, such as cloud computing. The network 730, in some cases with the aid of the computer system 701, can implement a peer-to-peer network, which may enable devices coupled to the computer system 701 to behave as a client or a server.

The CPU 705 can execute a sequence of machine-readable instructions, which can be embodied in a program or software. The instructions may be stored in a memory location, such as the memory 710. The instructions can be directed to the CPU 705, which can subsequently program or otherwise configure the CPU 705 to implement methods of the present disclosure. Examples of operations performed by the CPU 705 can include fetch, decode, execute, and writeback.

The CPU 705 can be part of a circuit, such as an integrated circuit. One or more other components of the system 701 can be included in the circuit. In some cases, the circuit is an application specific integrated circuit (ASIC).

The storage unit 715 can store files, such as drivers, libraries and saved programs. The storage unit 715 can store user data, e.g., user preferences, user programs, content items, entity information. The computer system 701 in some cases can include one or more additional data storage units that are external to the computer system 701, such as located on a remote server that is in communication with the computer system 701 through an intranet or the Internet.

The computer system 701 can communicate with one or more remote computer systems through the network 730. For instance, the computer system 701 can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iphone, Android-enabled device, Blackberry®), or personal digital assistants. The user can access the computer system 701 via the network 730.

Methods as described herein can be implemented by way of machine (e.g., computer processor) executable code stored on an electronic storage location of the computer system 701, such as, for example, on the memory 710 or electronic storage unit 715. The machine executable or machine readable code can be provided in the form of software. During use, the code can be executed by the processor 705. In some cases, the code can be retrieved from the storage unit 715 and stored on the memory 710 for ready access by the processor 705. In some situations, the electronic storage unit 715 can be precluded, and machine-executable instructions are stored on memory 710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 701 can include or be in communication with an electronic display 735 that comprises a user interface (UI) 740 for providing, for example, time-based illustrations of a significance signal and/or relationships between measurements of various input metrics that are involved in determining significance. The UI 740 may also illustrate lists of content events that are associated with a meta-event. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 705. The algorithm can, for example, find similarity between content events within a shared time window, identify content events that are associated with a meta-event, as well being used to perform other processes discussed herein.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

It should be understood from the foregoing that, while particular implementations have been illustrated and described, various modifications can be made thereto and are contemplated herein. It is also not intended that the invention be limited by the specific examples and embodiments provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method of identifying meta-events, the method comprising:
   receiving event items over a given time period, wherein each event item:
      is keyed to a point in time within the given time period;
      includes a content; and
      is associated with a sentiment rating;
   analyzing the event items to determine one or more predetermined areas of interests;
   measuring 1) a number of event items within a particular area of interest within the given time period, 2) a precision of the event items within the particular area of interest within the given time period, wherein the precision is a first positive function of a numerical proximity of the sentiment rating of each event item within the particular area of interest, 3) an accuracy of the event items within the particular area of interest within the given time period, wherein the accuracy is a second positive function of a numerical measure of a textual similarity of the content of each event item within the particular area of interest, and 4) a magnitude of the event items outside the particular area of interest within the given time period, wherein:
      the magnitude is a derivative of a change in a particular characteristic of the event items outside of the particular area of interest; and
      the magnitude is computed as:

$M(c_1, \ldots c_n) = f_M(\max(s(t(c_1)), \ldots, s(t(c_n))) - \min(s(t(c_1)), \ldots, s(t(c_n))))$ where $t(c_i)$ is a time stamp of $i^{th}$ content event within a time sampling window, $s(t)$ is a content assessment score at time t, and $f_M$ is a positively directed function;
   calculating a first significance score for the particular area of interest within the given time period based on the number of event items within the particular area of interest within the given time period, the precision of the event items, the accuracy of the event items, and the magnitude of the event items;

wherein the first significance score is calculated according to at least one of the following formulas:

$S_f$=the first significance score in the particular area of interest=$w_M M(c_1, \ldots c_n) + w_I V(c_1, \ldots c_n) + w_P P(c_1, \ldots c_n) + w_A A(c_1, \ldots c_n)$, or $S_f$=the first significance score in the particular area of interest=$[w_M M(c_1, \ldots c_n)][w_I V(c_1, \ldots c_n)][w_P P(c_1, \ldots c_n)][w_A A(c_1, \ldots c_n)]$ where, in the above:
      $M(c_1, \ldots c_n)$=the magnitude of the event items;
      $V(c_1, \ldots c_n)$=the number of event items;
      $P(c_1, \ldots c_n)$=the precision of the event items; and
      $A(c_1, \ldots c_n)$=the accuracy of the event items;
   calculating a historical significance score for the particular area of interest over an entire duration for which event items are present;
   calculating a historical significance signal by aggregating the historical significance score over the entire duration for which event items are present;
   comparing the first significance score and the historical significance score;
   determining that a meta-event has occurred when the first significance score exceeds the historical significance score by a threshold measure, wherein the threshold measure is determined based on a statistical value of the historical significance signal; and
   providing a notification or alert to a user of a client device that the meta-event has occurred.

2. The method of claim 1, wherein plurality of event items include at least one of a news item, publication, and social media content.

3. The method of claim 1, wherein said analyzing the event items is further used to determine one or more newly generated areas of interest.

4. The method of claim 1, further comprising:
   generating a signal based on the first significance score and the historical significance score by aggregating the first significance score or the historical significance score;
   displaying the signal as a function of time on a graphical user interface; and
   annotating the signal to illustrate meta-event peaks that exceed a threshold, wherein:
      said meta-event peaks are modified to add a boundary line at a nearest valley or zero crossing at a beginning of each meta-event peak and to add a boundary line at a nearest valley or zero crossing at an end of each meta-event peak; and
      the threshold is determined based on a statistical value of the signal.

5. The method of claim 4, further comprising:
   identifying a peak within the signal that is above a particular height, wherein said peak is associated with the meta-event;
   determining a plurality of events within a time period associated with the identified peak using the threshold;
   analyzing, using natural language processing methods, the event items to determine which event items are above a threshold of familiarity to each other, thereby identifying a set of event items associated with the meta-event.

6. The method of claim 5, wherein the identified peak is associated with more than one meta-event.

7. The method of claim 5, wherein the set of event items associated with the meta-event is presented as a list.

8. The method of claim 5, wherein the set of event items associated with the meta-event is presented as textual excerpts from each event item that is associated with the meta-event.

9. The method of claim 1, further comprising generating boundaries for the meta-event.

10. The method of claim 9, wherein the boundaries are located at nearest flanking dips in the first significance score.

11. The method of claim 9, wherein the boundaries are located at nearest zero crossings in the first significance score.

12. The method of claim 9, wherein the boundaries are located at a nearest local minimum relative to a peak in the first significance score.

13. The method of claim 9, wherein the boundaries identify bounds in the event items within the particular area of interest within the given time period.

\* \* \* \* \*